Sept. 17, 1968     L. M. McCRIGHT ET AL     3,401,957
SPLIT T
Filed Oct. 7, 1966     2 Sheets-Sheet 1
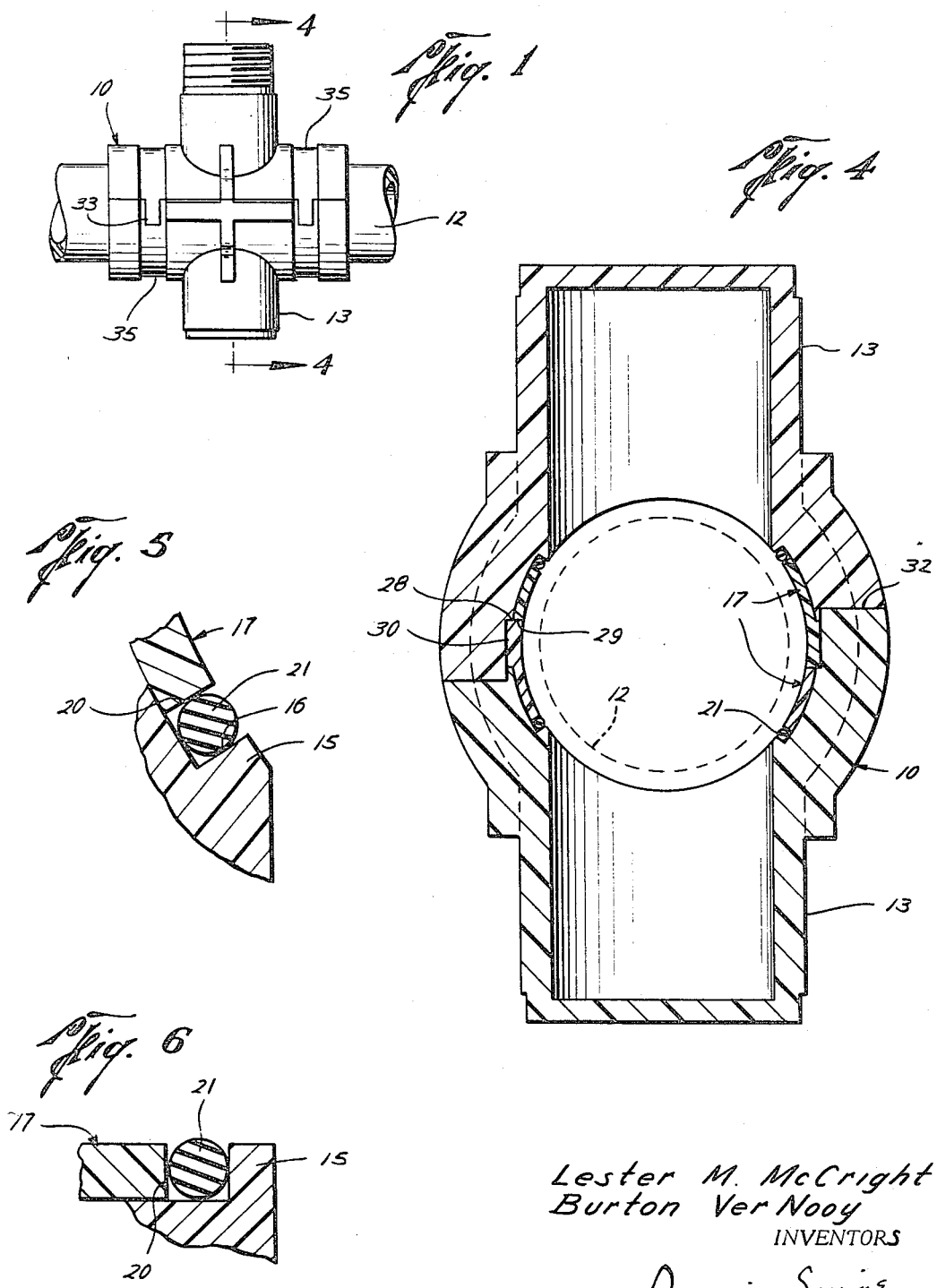
Lester M. McCright
Burton Ver Nooy
INVENTORS
BY Browning, Simms,
Hyer & Eubanks
ATTORNEYS

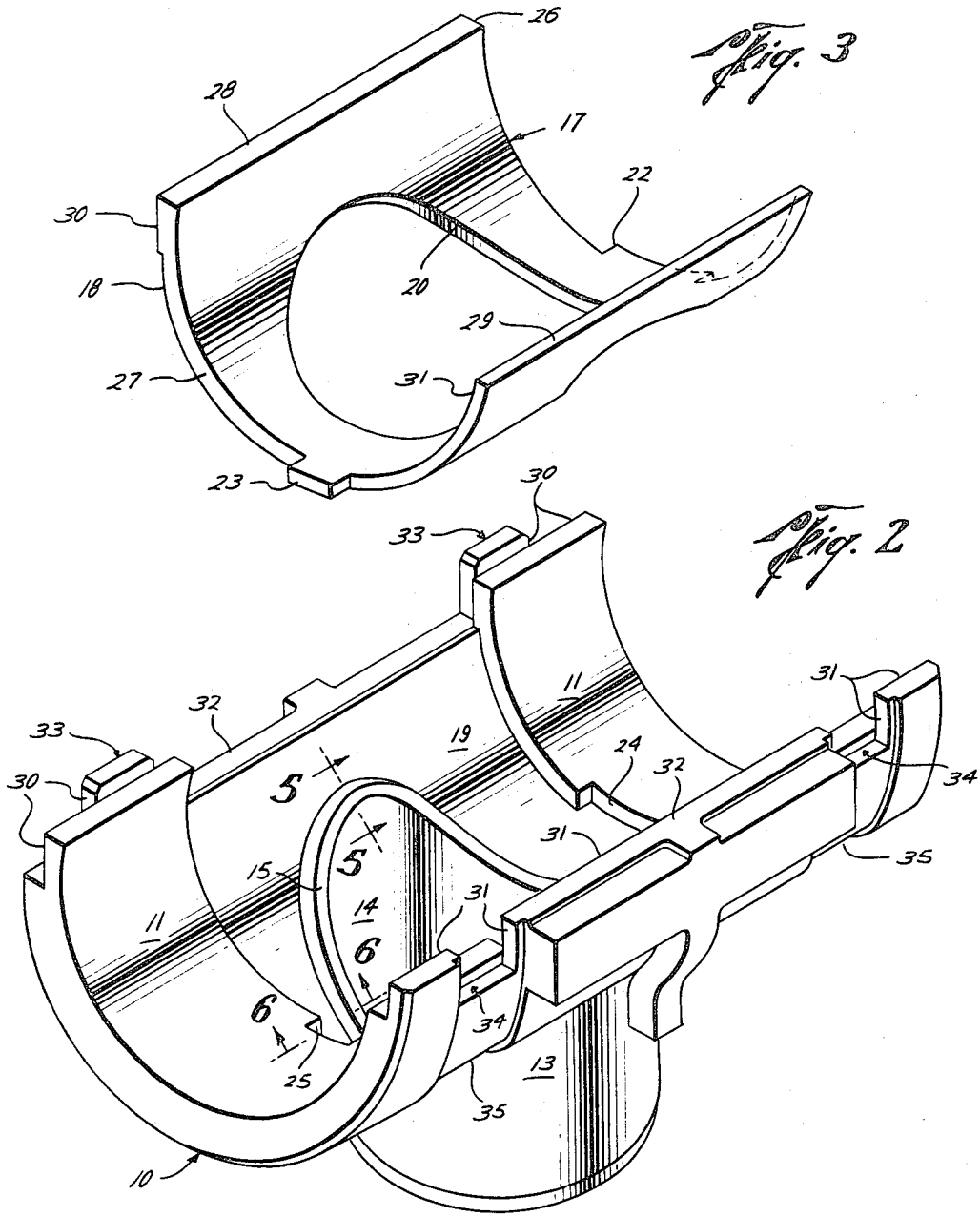

United States Patent Office 3,401,957
Patented Sept. 17, 1968

3,401,957
SPLIT T
Lester M. McCright, Tulsa, and Burton Ver Nooy,
Broken Arrow, Okla., assignors to T. D. Williamson Inc., Tulsa, Okla.
Filed Oct. 7, 1966, Ser. No. 585,092
5 Claims. (Cl. 285—197)

ABSTRACT OF THE DISCLOSURE

The invention relates to a die-cast split T in which a groove rectangular in cross-section is provided about a side opening from the T. One side wall of the groove is provided by an insert insertable into one portion of the run of the T to be welded therein. The other side wall of the groove is provided by the run portion and both walls are arranged to oppose each other and be substantially perpendicular to the inner surface of the run portion throughout their length. This construction permits the T to be fabricated from pieces that are die-cast using non-collapsing dies, thereby permitting the T to be produced with sufficient economy as to be commercially feasible.

---

This invention relates to a split T adapted to be placed about a pipe so that the latter can be hot tapped to provide at least one lateral branch therefrom.

In the past, split T's have been used in pipeline operations in order to make a hot tap connection into the pipeline. Such a split T basically has its run section split longitudinally into two semi-annular pieces. These are placed about the pipeline and welded in position. Following this, a tapping valve is attached to the branch of the T and a hot tapping machine connected to the valve. The valve is then opened and the tapping machine operated to cut a side outlet in the pipeline after which the valve is closed and the tapping machine removed. In many situations, the welded-on type split T cannot be employed. For example, plastic pipe does not permit high temperature welding. In this and other applications, it would be highly desirable to have a split T which could be fastened in place simply by gluing or solvent welding. In such a T, the joint between the halves must be sufficiently strong to withstand line pressure which applies forces tending to separate the two halves of the T.

Also, in many instances, the situation is such that only die-cast or injection molded split T's can be produced with sufficient economy that they are commercially feasible.

It is usually very desirable that the T have an O-ring seal or the like sealing between the run section and the pipe about the opening leading to the side branch. As indicated above, the split T can be glued or solvent welded to the pipe so that in some cases, the glued or welded joint serves as a seal. However, in other instances, a suitable glue or solvent may not be available which is compatible with the material of the split T and that of the pipe to form a suitable seal. Also, in some instances, even though a suitable glue or solvent is available, it may form an imperfect seal. In other cases, it may not be desirable to wait for the glue or solvent to set-up before beginning the hot tapping operation. Thus the provision of an O-ring or other suitable fluid energized seal will provide a positive mechanical seal under all of these and other circumstances. However, a problem arises in providing the groove in a die-castable or injection moldable part. The groove should be substantially rectangular in cross-section in order to accommodate the sealing ring properly and the groove must be square with the pipe throughout its length. In other words, the walls of the groove must be substantially perpendicular to the contiguous wall of the pipe. This means that at least a part of the groove must be undercut so that the only way it can be die-cast or injection molded in one piece is to use a collapsible die or mold. These, of course, are very expensive.

It is therefore an object of this invention to provide a split T construction having such a groove therein and yet which can be die cast or injection molded using relatively economical solid non-collapsing dies.

Another object is to provide such a T in which at least the branch portion of the two halves are identical thereby further reducing the investment in dies.

Another object is to provide a split T which is constructed so that when the two halves are glued or solvent welded together along their longitudinal seams, the resulting joint has substantial areas placed in shear by forces tending to separate the two portions of the T thereby greatly strengthening the joint between the two portions.

Other objects, advantages and features of the invention will be apparent to one skilled in the art upon consideration of the specification, the claims and the drawings, wherein:

FIG. 1 shows a preferred embodiment of the split T assembled on a pipe;

FIG. 2 is an isometric view of one-half of the split T with the insert removed;

FIG. 3 shows the insert which has been removed from the portion of the split T shown in FIG. 2;

FIG. 4 is an enlarged vertical section taken along the line 4—4 of FIG. 1; and

FIGS. 5 and 6 are views taken on the lines 5—5 and 6—6 of FIG. 2 showing the insert and gasket in assembled position.

The preferred embodiment shows a split T having identical halves with the exception that one of the branch sections on one half is threaded for external connection and is somewhat larger. Therefore, only one half will be described except as otherwise indicated.

In the preferred embodiment, each half of the split T includes, when assembled, the pieces shown in FIGS. 2 and 3 together with an O-ring as indicated in FIGS. 5 and 6. The T has a run section designated generally by 10 which is split longitudinally into two pieces, one of which is shown in FIG. 2. Each piece has a semi-circular interior 11 shaped so as to mate with a pipe 12 (FIG. 1) when the T is assembled. In the preferred embodiment, each piece has a side branch 13 having an opening 14 into the interior of the run piece. In the preferred embodiment there are two side branches from the finally assembled T, although it will be understood that in a lesser preferred form, one of the pieces can be formed without the side branch in which case it will be generally semi-annular in configuration.

The run piece is formed with an annular rib 15 surrounding the opening 14 and having an outer wall 16 for a purpose described later.

An insert, generally designated at 17, is provided as shown in FIG. 3. This insert is generally semi-annular in lateral cross-section and has a surface 18 shaped to closely mate with the interior surface 19 of piece 10, the latter surface being formed by relieving the interior of the piece between rib 15 and portions 11. Preferably, both of surfaces 18 and 19 are semi-circular in lateral cross-section. The insert has an inner wall 20 which, with the insert fastened in position in piece 10, as indicated in FIGS. 5 and 6, is spaced from and opposes outer wall 16 of rib 15. In this manner, a groove, generally rectangular in lateral cross-section, is provided around opening 14 to receive an O-ring 21 (FIGS. 5 and 6). The term "rectangular" is used to include a square.

It will thus be seen that by making each half of the T in two pieces and employing an insert which provides wall 20 for the O-ring groove, the piece 10 can be die cast or injection molded without having to use collapsible dies. In other words, the dies can move apart in a vertical direction when the piece is cast or molded in the FIG. 2 position. If the piece were to be molded in one piece and the insert not used, some provision would have to be made for retracting that part of the die which forms shoulder 20.

Insert 17 is shown as including tabs 22 and 23 of different widths. These mate with corresponding recesses 24 and 25 in piece 10 and facilitate assembly in that they prevent the inserts from being assembled backward and also prevent misalignment.

Preferably the insert extends circumferentially as shown at 26 and 27 to provide edges 28 and 29 extending longitudinally of the run section and positioned to abut with corresponding edges of the insert in the other run piece. Thus the two inserts provide for full circle encirclement of the pipe making for a stronger structure.

Preferably, the run sections are formed so that each have circumferentially extending surfaces which abut with each other when the two sections are assembled. Thus, when these surfaces are glued or welded together, the resulting joint provides areas in shear when forces are applied tending to separate the run sections. These surfaces have been designated at 30 on one side of the run section and at 31 on the other side, it being understood that the surfaces 31 on one run section will mate with the surfaces 30 on the other run section. Of course, there are other surfaces such as sections 32 which extend generally radially so that the joint resulting from mating of these surfaces will provide areas in tension when forces are applied tending to separate the two run pieces. However, the surface area of the total joint is much greater and much stronger than it would be if only radially extending surfaces were provided. It will be understood that the surfaces 30, 31 and 32 may take many different forms as long as the two run sections mate and sufficient surface area and area in tension is provided to insure a secure joint.

In order to provide additional circumferentially extending surfaces and also to aid in the assembly of the split T and to assure that it is always properly assembled and that there is no longitudinal misalignment of the pieces, a pair of tongues 33 can be provided on one side of the run piece to mate with complementary openings 34 on the other run piece of the split T.

It will be seen that when the split T run sections have each been assembled, each provide a semi-circular inner surface conforming to the contour of the pipe on which the T is to be mounted. Moreover, this surface preferably extends from end to end of the run section so as to provide a maximum area over which glue or solvent can be spread for welding or attaching the T to the pipe.

In most instances, it is desirable to mechanically clamp the T to the pipe. For this purpose, grooves 35 can be formed at each end of the T to receive a metal band or clamp (not shown) similar to an automobile radiator hose clamp.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A die cast split T for assembly about a length of pipe comprising: a run section split longitudinally into at least two pieces each having a substantially semi-circular interior so as to mate with a pipe, at least one of the pieces having a side branch providing a first opening into the interior of said one piece, a rib on the interior of said one piece surrounding said first opening and providing an outer wall, said one piece having an interior surface extending outwardly from the base of said rib and of semi-cylindrical configuration, a semi-cylindrical insert positioned in said one piece to a position in which it mates with said interior surface of said one piece, said insert having a second opening therethrough, said second opening being coaxial with said first opening and of a larger diameter than said outer wall of said rib, said second opening providing when so positioned an inner wall spaced from and opposing said rib's outer wall to provide a groove therebetween surrounding said opening, said walls along substantially their entire length both being substantially perpendicular to said interior surface so that said groove has a substantially rectangular lateral cross-section throughout its length and is adapted to receive a fluid energized seal, such as an O-ring, to seal about said opening when the split T is assembled about a pipe, said insert functioning to provide said inner wall when in said position whereby said insert and one piece can be die cast separately using noncollapsing dies, and means welding the insert to said one piece when the insert is in said position in said one piece to provide a run element.

2. The split T of claim 1 wherein the insert extends circumferentially to provide edges extending along the run element and positioned to abut with opposing surfaces on the other run element when the run elements are assembled about a pipe.

3. The split T of claim 1 wherein said run elements each have circumferentially interlocking surfaces respectively in abutment with each other when the run elements are assembled on a pipe so that when these surfaces are welded together, the resulting joint provides areas in shear when forces are applied tending to separate the run elements.

4. The split T of cliam 3 wherein a portion of said surfaces are provided by a circumferentially extending tongue on one run element and a complementary opening in the other run element to receive the tongue.

5. The split T of claim 4 wherein the tongue and opening surfaces of one run element are complementary to the corresponding surfaces of the other run element whereby only a single configuration need be used to supply both elements.

References Cited

UNITED STATES PATENTS

| 1,278,128 | 9/1918 | Flower | 285—197 |
| 1,616,390 | 2/1927 | Powell | 285—197 |
| 1,843,191 | 2/1932 | Balze | 285—197 |
| 1,888,241 | 11/1932 | Rah | 285—373 X |

FOREIGN PATENTS

| 1,162,594 | 4/1958 | France. |

OTHER REFERENCES

German printed application No. 1,063,429, August 1959.

German printed application No. 1,213,179, March 1966.

CARL W. TOMLIN, *Primary Examiner.*

R. G. BERKLEY, *Assistant Examiner.*